(12) United States Patent
Wahlen et al.

(10) Patent No.: US 7,198,330 B2
(45) Date of Patent: Apr. 3, 2007

(54) FITTING FOR A VEHICLE SEAT

(75) Inventors: Hilmar Wahlen, Hückeswagen (DE); Gaetan Fraisse, Hilden (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/336,759

(22) Filed: Jan. 20, 2006

(65) Prior Publication Data

US 2006/0125301 A1 Jun. 15, 2006

Related U.S. Application Data

(63) Continuation of application No. PCT/EP2004/008562, filed on Jul. 30, 2004.

(30) Foreign Application Priority Data

Aug. 6, 2003 (DE) ................. 103 35 869

(51) Int. Cl.
*B60N 2/02* (2006.01)
(52) U.S. Cl. .............. 297/374; 297/362; 297/367
(58) Field of Classification Search ............. 297/367, 297/362, 374; 403/62; 16/324, 325
See application file for complete search history.

(56) References Cited

U.S. PATENT DOCUMENTS

| | | | | |
|---|---|---|---|---|
| 3,156,004 A | | 11/1964 | Strien et al. | |
| 4,337,978 A | * | 7/1982 | Kazaoka et al. | ............ 297/367 |
| 5,090,264 A | | 2/1992 | Droulon et al. | |
| 5,224,759 A | * | 7/1993 | Matsuura et al. | ........... 297/367 |
| 5,547,254 A | * | 8/1996 | Hoshihara | .................... 297/367 |
| 6,883,869 B2 | * | 4/2005 | Liu et al. | ..................... 297/367 |
| 2002/0125756 A1 | * | 9/2002 | Asano | ........................ 297/367 |
| 2003/0155800 A1 | * | 8/2003 | Asano | ........................ 297/367 |
| 2003/0230923 A1 | * | 12/2003 | Uramichi | ..................... 297/367 |
| 2004/0075325 A1 | | 4/2004 | Assmann et al. | |

FOREIGN PATENT DOCUMENTS

| | | |
|---|---|---|
| DE | 1 150 586 | 6/1963 |
| DE | 201 20 768 U1 | 5/2002 |
| FR | 1197892 | 12/1959 |
| GB | 1168790 | 10/1969 |
| WO | WO 97/20706 | 6/1997 |

\* cited by examiner

*Primary Examiner*—David R. Dunn
*Assistant Examiner*—Sarah B. McPartlin
(74) *Attorney, Agent, or Firm*—Womble Carlyle Sandridge & Rice, PLLC

(57) ABSTRACT

In the case of a fitting for a vehicle seat, in particular for a motor vehicle seat, having a first part (11), a second part (12) that is rotatable and lockable relative to the first part (11), and a profiled shaft (16), the actuation of which unlocks the fitting (1), a spring (22) simultaneously pretensions the shaft (16) counter to the actuating direction and secures the shaft (16) relative to the fitting (1) in the axial direction of the shaft (16).

28 Claims, 1 Drawing Sheet

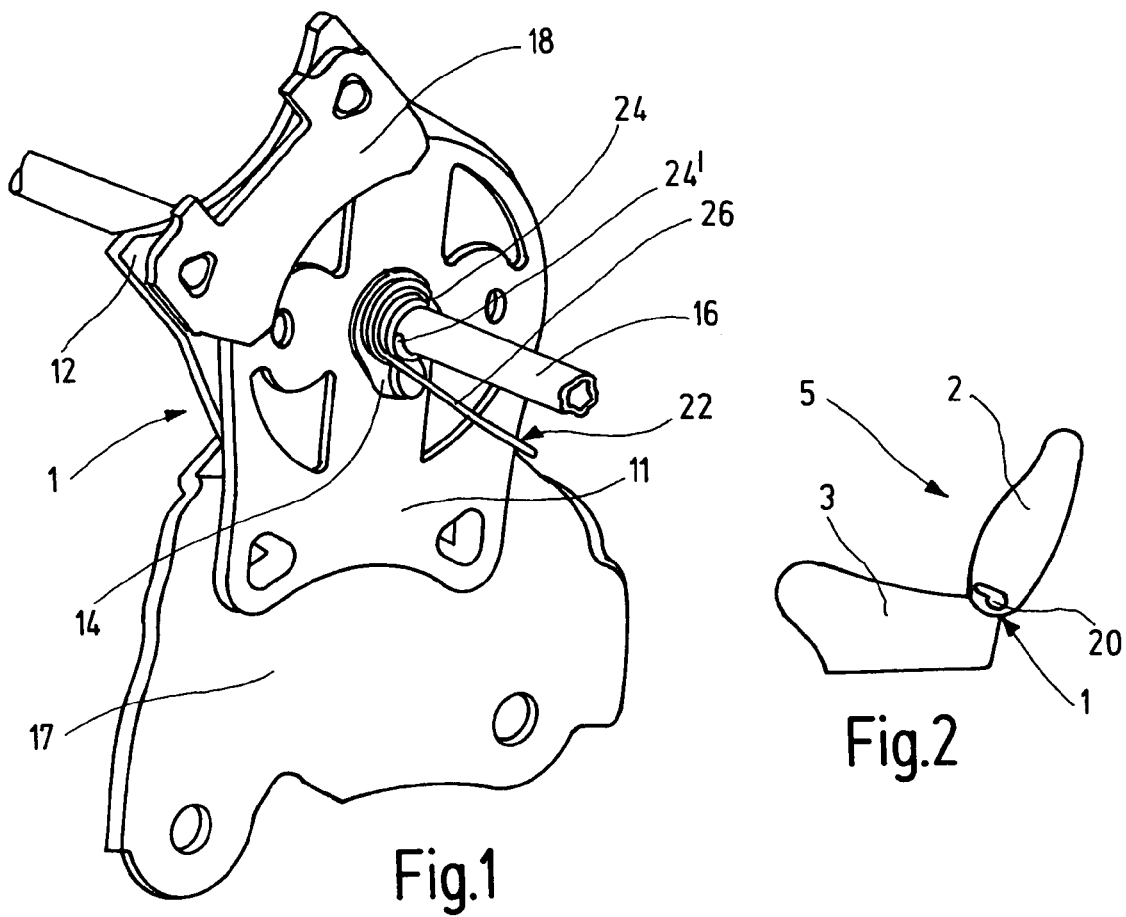
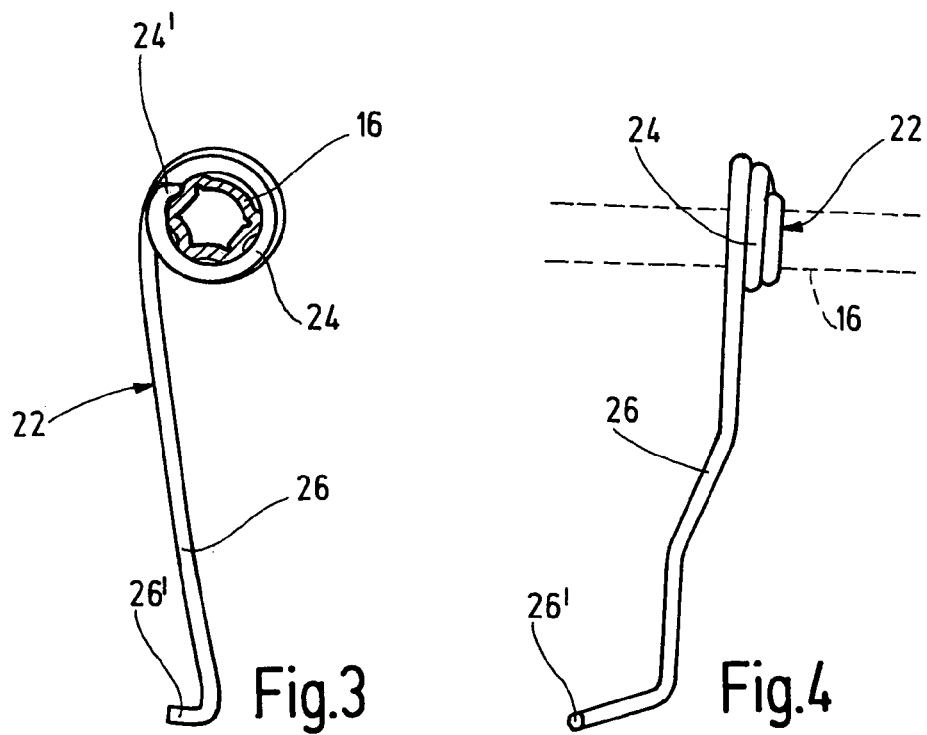

FITTING FOR A VEHICLE SEAT

CROSS-REFERENCE TO RELATED APPLICATION

The present application is a continuation of International Application PCT/EP2004/008562, which was filed Jul. 30, 2004. The entire disclosure of PCT/EP2004/008562, which was filed Jul. 30, 2004, is incorporated herein by reference.

BACKGROUND OF THE INVENTION

The present invention relates to a fitting for a vehicle seat, in particular for a motor vehicle seat, having a first fitting part, a second fitting part that is rotatable and lockable relative to the first fitting part, and a profiled shaft that is for being actuated to unlock the fitting.

In a known fitting of the type described immediately above, the shaft also serves for transmitting the unlocking actuation to another, basically identical fitting. The components arranged within the fitting are dimensioned in such a manner that, even when all of the tolerances are added up, the fitting typically remains locked. However, when there are very large tolerances, there may be slight rattling noises, which are annoying. To avoid them, the tolerances have to be kept small.

BRIEF SUMMARY OF SOME ASPECTS OF THE INVENTION

An aspect of the present invention is the provision of an improvement to a fitting of the type mentioned above.

In accordance with one aspect of the present invention, a fitting for a vehicle seat, in particular for a motor vehicle seat, has a first part (e.g., lower part) of the fitting, a second part (e.g., upper part) of the fitting that is rotatable and lockable relative to the lower part of the fitting, a profiled shaft that is for being actuated to unlock the fitting, and a spring. The spring pretensions the shaft counter to the actuating direction, and at the same time the spring secures the shaft relative to the fitting in the axial direction of the shaft.

Because the spring pretensions the shaft counter to the actuating direction, i.e. in the locking direction, a closing moment is introduced into the fitting via the shaft and, as a consequence, the fitting is free from play. Annoying rattling noises are prevented. Because the spring at the same time secures the shaft relative to the fitting in the axial direction, there is also a play-free position in the axial direction. As a result, an otherwise additionally provided axial securing means can be omitted, so that a component can be saved to reduce the production costs.

For both of its functions, the spring preferably sits with a first leg on the shaft, the first leg preferably being looped repeatedly about the shaft in order to ensure a fixed attachment in the manner of a looping spring brake, in particular for the function as an axial securing means. In addition, an inner hook provided at the end of the first leg preferably reaches into the profile of the shaft (e.g., into a recess defined in the outer peripheral surface of the shaft), in particular at least approximately in a formfitting manner, in order to improve the fixed attachment for the function of securing against rattling and the function as an axial securing means, and in order to facilitate the installation.

The spring is preferably supported with a second leg on the fitting which then forms the counter bearing for the closing moment. This second leg preferably protrudes in a largely stretched-out manner from the shaft and at the end preferably has an outer hook which reaches behind the fitting (e.g., by extending at least partially around an outer edge of the fitting), for example behind the lower part of the fitting and/or an adaptor attached to the lower part of the fitting.

The fitting designed according to the invention can be used for all types of vehicle seats with an inclination-adjustable back rest, which are understood also to include vehicle seats having a back rest which can merely be folded. The fitting is preferably used in pairs if the actuation of a shaft which implements the transmission between the two fittings is driven manually.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which:

FIG. 1 is a perspective view of some of the features of the exemplary embodiment, FIG. 2 is a schematic illustration of a vehicle seat, FIG. 3 is a view of the spring together with a radial section through the shaft, and FIG. 4 shows a further view of the spring together with a side view of the shaft, wherein the shaft is illustrated by dashed lines.

DETAILED DESCRIPTION OF THE EXEMPLARY EMBODIMENT

A fitting 1 is provided for adjusting the inclination of a back rest 2 relative to a seat part 3 of a vehicle seat 5 in a motor vehicle. The fitting 1 is positioned on one side of the vehicle seat 5. A fitting (not shown), which basically acts in an identical manner to the fitting 1, is positioned on the opposite side of the vehicle seat 5 from the fitting 1.

The fitting 1 has a lower part 11 (which for example can also be referred to as a first part of the fitting 1), an upper part 12 (which for example can also be referred to as a second part of the fitting 1) that is rotatable relative to the lower part 11, a driver 14, and a horizontally arranged, profiled, hollow shaft 16 that is for transmitting to the other fitting (not shown). The geometry and arrangement of the shaft 16 define the directional details used in this Detailed Description section of this disclosure.

An adaptor 17, by way of which the fitting 1 is fitted to the structure of the seat part 3, is fitted to the lower part 11 of the fitting. A retaining plate 18 is fitted to the upper part 12 of the fitting 1. The retaining plate 18 and the upper part 12 of the fitting 1 are fitted together fitted to the structure of the back rest 2. The retaining plate 18 at least partially engages over the upper edge region of the lower part 11 of the fitting 1 and thus ensures that the two parts 11 and 12 of the fitting 1 are axially held together. The adaptor 17 engages in the same manner over the lower edge of the upper part 12 of the fitting 1 and therefore acts as a further retaining plate.

In a construction which is known per se, the following are provided in the interior of the fitting 1: an eccentric (not shown) that sits in a rotationally fixed manner on (i.e., rotates with) the driver 14; two tooth segments (not shown) that are mounted for moving radially within the lower part 11 of the fitting 1, and are acted upon by the eccentric; a slotted-guide disk that is for retrieving the tooth segments; and a toothed rim that is formed on the upper part 12 of the fitting 1. In the locked state of the fitting 1, a pretensioning of the eccentric ensures that the tooth segments are in engagement with the toothed rim. By actuation of the shaft 16, i.e. rotation in the circumferential direction by means of a hand lever 20 fitted to an end of the shaft 16, the driver 14, which sits in a rotationally fixed manner on the shaft 16, is rotated. The hand lever 20 may also be fitted in such a manner that it rotates the driver 14 which then rotates the shaft 16. Regarding unlocking the fitting 1, the driver 14 carries along the eccentric which, in turn, pulls the tooth segments radially inward via the slotted-guide disk, so that the fitting 1 is unlocked.

Due to tolerances during the manufacturing and the installation, the fitting 1 has a small amount of play in the locked state, so that slight rattling noises could occur. In order to secure the fitting 1 against rattling, a spring 22 is provided which pretensions (e.g., biases) the shaft 16 counter to the actuating direction, i.e. supports the locking by introducing a closing moment into the fitting. However, the spring 22 is dimensioned in such a manner that its pretensioning is very small in relation to the actuating force to be applied for the unlocking.

The spring 22 is a specially coiled leg spring. An inner, first leg 24 of the spring 22 sits on the shaft 16 and is looped repeatedly about the shaft 16. The individual coils of the first leg 24 of the spring 22 have a decreasing diameter toward the spring's end that is part of the first leg 24. An inner hook 24' is formed at the spring's end that is part of the first leg 24. By way of the inner hook 24', the first leg 24 reaches approximately in a formfitting manner into the profile of the shaft 16. An outer, second leg 26 of the spring 22 is formed integrally with the inner leg 24 of the spring 22. The second leg 26 protrudes in a largely stretched-out manner from the shaft 16. To support the spring 22, the outer leg 26 reaches with an angled outer hook 26' behind the lower part 11 of the fitting 1 and the adaptor 17, in the region in which the lower part 11 and the adaptor 17 are arranged in an overlapping manner with respect to one another.

Because the shaft 16 is looped around by means of the first leg 24 of the spring 22, and the inner hook 24' engages in the profile of the shaft 16, the spring 22 sits fixedly on the shaft 16 such that the spring 22 axially secures the shaft 16 relative to the fitting 1.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A fitting for a vehicle seat, the fitting comprising:
   a first part of the fitting;
   a second part of the fitting that is
   (a) rotatable relative to first part of the fitting while the fitting is in an unlocked state, and
   (b) restricted from rotating relative to the first part of the fitting while the fitting is in a locked state;
   a profiled shaft mounted so that the fitting transitions from the locked state to the unlocked state in response to the shaft being rotated in a first direction; and
   a spring operatively associated with the shaft for simultaneously
   (a) biasing the shaft in a manner that seeks to cause the shaft to rotate in a second direction, wherein the second direction is opposite from the first direction, and
   (b) restricting the shaft from moving in the shaft's axial direction relative to the fitting,
   wherein
   (a) the spring includes a first leg,
   (b) the first leg of the spring sits on the shaft,
   (c) the shaft includes an outer peripheral surface that defines a recess,
   (d) an end of the first leg comprises a hook, and
   (e) at least a portion of the hook is positioned in the recess defined by the outer peripheral surface of the shaft.

2. The fitting according to claim 1, wherein the first leg includes a plurality of loops that extend around the shaft.

3. The fitting according to claim 2, wherein:
   the plurality of loops includes a first loop and a second loop,
   each of the first loop and the second loop extends at least partially around the shaft,
   as measured in the shaft's axial direction and compared to the second loop, the first loop is positioned farther from an end of the shaft, and
   as compared to the second loop, the first loop extends farther radially outward from the shaft's axis.

4. The fitting according to claim 1, wherein the portion of the hook being positioned in the recess comprises:
   the portion of the hook interacting with the recess in a substantially formfitting manner.

5. The fitting according to claim 1, wherein the spring includes a second leg that is supported on at least one support selected from the group consisting of:
   the first part of the fitting, and
   an adapter attached to the first part of the fitting.

6. The fitting according to claim 5, wherein the second leg protrudes away from the shaft in a substantially stretched-out manner.

7. The fitting according to claim 5, wherein:
   the second leg protrudes away from the shaft;
   an end of the second leg comprises a hook; and
   at least a portion of the hook extends at least partially around an outer edge of the fitting.

8. The fitting according to claim 7, wherein the outer edge of the fitting comprises an outer edge of the first part of the fitting.

9. The fitting according to claim 7, wherein the outer edge of the fitting comprises at least one outer edge selected from the group consisting of:
   an outer edge of the first part of the fitting, and
   an outer edge of an adapter attached to the first part of the fitting.

10. The fitting according to claim 1 in combination with the vehicle seat, wherein:
    the vehicle seat includes a seat part and a back rest, and
    the fitting is for adjusting the back rest's inclination relative to the seat part.

11. The fitting according to claim 1, wherein the spring includes a second leg, and the second leg of the spring is supported on the fitting at a position that is distant from the first leg.

12. The fitting according to claim 1, further comprising a driver that is mounted for rotating with the shaft, wherein the fitting transitions from the locked state to the unlocked state in response to the driver being rotated in the first direction.

13. The fitting according to claim 12, wherein at least a portion of the driver is positioned between the spring and the second part of the fitting.

14. The fitting according to claim 1, wherein:
    the shaft includes opposite first and second ends, the spring is positioned between the first and second ends of the shaft, and the spring is distant from each of the first and second ends of the shaft.

15. The fitting according to claim 1, wherein the shaft extends through at least the first fitting part.

16. The fitting according to claim 1, wherein the spring being operatively associated with the shaft for restricting the shaft from moving in the shaft's axial direction relative to the fitting comprises:

the spring restricting the shaft from moving in both
(a) a third direction that extends in the shaft's axial direction, and
(b) a fourth direction that extends in the shaft's axial direction and is opposite from the third direction.

17. A fitting for a vehicle seat, the fitting comprising:
a first part of the fitting;
a second part of the fitting that is
(a) rotatable relative to first part of the fitting while the fitting is in an unlocked state, and
(b) restricted from rotating relative to the first part of the fitting while the fitting is in a locked state;
a profiled shaft mounted so that the fitting transitions from the locked state to the unlocked state in response to the shaft being rotated in a first direction; and
a spring operatively associated with the shaft for simultaneously
(a) biasing the shaft in a manner that seeks to cause the shaft to rotate in a second direction, wherein the second direction is opposite from the first direction, and
(b) restricting the shaft from moving in the shaft's axial direction relative to the fitting,
wherein
(a) the spring includes a first leg,
(b) the first leg of the spring sits on the shaft,
(c) the shaft includes an outer peripheral surface that defines a recess,
(d) the spring includes opposite first and second ends,
(e) the first end of the spring is part of the first leg,
(f) the first end of the spring comprises a hook, and
(g) at least a portion of the hook is positioned in the recess defined by the outer peripheral surface of the shaft.

18. A fitting for a vehicle seat, the fitting comprising:
a first part of the fitting;
a second part of the fitting that is
(a) rotatable relative to first part of the fitting while the fitting is in an unlocked state, and
(b) restricted from rotating relative to the first part of the fitting while the fitting is in a locked state;
a profiled shaft mounted so that the fitting transitions from the locked state to the unlocked state in response to the shaft being rotated in a first direction; and
a spring operatively associated with the shaft for simultaneously
(a) biasing the shaft in a manner that seeks to cause the shaft to rotate in a second direction, wherein the second direction is opposite from the first direction, and
(b) restricting the shaft from moving in the shaft's axial direction relative to the fitting,
wherein
(a) the spring includes a first leg,
(b) the first leg of the spring sits on the shaft,
(c) the spring includes a second leg,
(d) the second leg extends away from the shaft,
(e) the spring includes opposite first and second ends,
(d) the second end of the spring is part of the second leg,
(g) the second end of the spring comprises a hook, and
(h) at least a portion of the hook extends at least partially around an outer edge of the fitting.

19. The fitting according to claim 18, wherein the outer edge of the fitting comprises at least one outer edge selected from the group consisting of:
an outer edge of the first part of the fitting, and
an outer edge of an adapter attached to the first part of the fitting.

20. The fitting according to claim 18, wherein the first leg includes a plurality of loops that extend around the shaft.

21. The fitting according to claim 18, wherein:
the shaft includes an outer peripheral surface that defines a recess;
the first end of the spring is part of the first leg;
the first end of the spring comprises a hook; and
at least a portion of the first end's hook is positioned in the recess defined by the outer peripheral surface of the shaft.

22. A fitting for a vehicle seat, the fitting comprising:
a first part of the fitting;
a second part of the fitting that is
(a) rotatable relative to first part of the fitting while the fitting is in an unlocked state, and
(b) restricted from rotating relative to the first part of the fitting while the fitting is in a locked state;
a shaft mounted so that the fitting transitions from the locked state to the unlocked state in response to the shaft being rotated in a first direction; and
a spring operatively associated with the shaft for simultaneously
(a) biasing the shaft in a manner that seeks to cause the shaft to rotate in a second direction, wherein the second direction is opposite from the first direction, and
(b) restricting the shaft from moving in the shaft's axial direction relative to the fitting,
wherein
(a) the spring being operatively associated with the shaft comprises the spring being mounted to, and extending completely around, the shaft,
(b) the shaft includes an outer peripheral surface that defines a recess, and
(c) the spring being mounted to the shaft comprises a portion of the spring extending into the recess.

23. A fitting for a vehicle seat, the fitting comprising:
a first part of the fitting;
a second part of the fitting that is
(a) rotatable relative to first part of the fitting while the fitting is in an unlocked state, and
(b) restricted from rotating relative to the first part of the fitting while the fitting is in a locked state;
a profiled shaft mounted so that the fitting transitions from the locked state to the unlocked state in response to the shaft being rotated in a first direction; and
a spring operatively associated with the shaft for simultaneously
(a) biasing the shaft in a manner that seeks to cause the shaft to rotate in a second direction, wherein the second direction is opposite from the first direction, and
(b) restricting the shaft from moving in the shaft's axial direction relative to the fitting, wherein the spring includes a leg that is supported on at least one support selected from the group consisting of
(a) the first part of the fitting, and
(b) an adapter attached to the first part of the fitting, and
wherein
(a) the leg protrudes away from the shaft,
(b) an end of the leg comprises a hook, and
(c) at least a portion of the hook extends at least partially around an outer edge of the fitting.

24. The fitting according to claim 23, wherein the outer edge of the fitting comprises an outer edge of the first part of the fitting.

25. The fitting according to claim 23, wherein the outer edge of the fitting comprises at least one outer edge selected from the group consisting of:
an outer edge of the first part of the fitting, and
an outer edge of an adapter attached to the first part of the fitting.

26. A fitting for a vehicle seat, the fitting comprising:
a first part of the fitting;
a second part of the fitting that is
(a) rotatable relative to first part of the fitting while the fitting is in an unlocked state, and
(b) restricted from rotating relative to the first part of the fitting while the fitting is in a locked state;
a profiled shaft mounted so that the fitting transitions from the locked state to the unlocked state in response to the shaft being rotated in a first direction; and
a spring operatively associated with the shaft for simultaneously
(a) biasing the shaft in a manner that seeks to cause the shaft to rotate in a second direction, wherein the second direction is opposite from the first direction, and
(b) restricting the shaft from moving in the shaft's axial direction relative to the fitting,
wherein
(a) the spring includes a first leg,
(b) the first leg of the spring sits on the shaft,
(c) the first leg includes a plurality of loops that extend around the shaft,
(d) the plurality of loops includes a first loop and a second loop,
(e) each of the first loop and the second loop extends at least partially around the shaft,
(f) as measured in the shaft's axial direction and compared to the second loop, the first loop is positioned farther from an end of the shaft, and
(g) as compared to the second loop, the first loop extends farther radially outward from the shaft's axis.

27. The fitting according to claim 26, wherein:
the shaft includes an outer peripheral surface that defines a recess, and
a portion of the spring extends into the recess.

28. The fitting according to claim 26, wherein:
the spring includes a second leg,
the second leg protrudes away from the shaft,
the second leg includes a hook, and
at least a portion of the hook extends at least partially around an outer edge of the fitting.

* * * * *